United States Patent
Suzuki

(10) Patent No.: US 9,753,180 B2
(45) Date of Patent: Sep. 5, 2017

(54) METHOD FOR MULTIPHASE FLOW UPSCALING

(71) Applicant: Satomi Suzuki, Houston, TX (US)

(72) Inventor: Satomi Suzuki, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 460 days.

(21) Appl. No.: 14/374,503

(22) PCT Filed: Feb. 20, 2013

(86) PCT No.: PCT/US2013/026913
§ 371 (c)(1),
(2) Date: Jul. 24, 2014

(87) PCT Pub. No.: WO2013/148021
PCT Pub. Date: Oct. 3, 2013

(65) Prior Publication Data
US 2015/0019183 A1    Jan. 15, 2015

Related U.S. Application Data

(60) Provisional application No. 61/616,807, filed on Mar. 28, 2012.

(51) Int. Cl.
*G06F 7/60* (2006.01)
*G06F 17/10* (2006.01)
(Continued)

(52) U.S. Cl.
CPC ............ *G01V 99/005* (2013.01); *E21B 43/16* (2013.01); *G01V 99/00* (2013.01); *G06F 17/5009* (2013.01)

(58) Field of Classification Search
None
See application file for complete search history.

(56) References Cited

U.S. PATENT DOCUMENTS

| 5,844,799 A | 12/1998 | Joseph et al. |
| 6,106,561 A | 8/2000 | Farmer |

(Continued)

FOREIGN PATENT DOCUMENTS

| EP | 1865343 | 12/2007 |
| WO | WO 2007/106244 | 9/2007 |

OTHER PUBLICATIONS

Chen, Yuguang, et al., (2009), "Local-Global Two-Phase Upscaling of Flow and Transport in Heterogeneous Formations", *Multiscale Model. Simul.* 8, pp. 125-153.

(Continued)

*Primary Examiner* — Craig Dorais
(74) *Attorney, Agent, or Firm* — ExxonMobil Upstream Research Company—Law Department

(57) ABSTRACT

A method of multiphase flow upscaling of a fine scale geologic model. A local domain is defined from the fine scale geologic model. The local domain includes adjacent upstream and downstream coarse grid domains and a concatenated domain adjacent the upstream coarse grid domain. A coarse grid interface is defined between the upstream coarse grid domain and the downstream coarse grid domain. Boundary conditions are imposed on various faces of the components of the local domain. Fluid flow is simulated through the local domain for a plurality of time steps until the local domain is completely flooded. A fine scale solution of saturation and flow rate of individual fluid phases across the coarse grid interface is recorded at each time step. A pseudo-function is constructed by post-processing results of the simulation of fluid flow. The fine scale geologic model is upscaled to a coarse scale geologic model using the pseudo-function.

23 Claims, 7 Drawing Sheets

(51) Int. Cl.
*G01V 99/00* (2009.01)
*E21B 43/16* (2006.01)
*G06F 17/50* (2006.01)

(56) References Cited

U.S. PATENT DOCUMENTS

| | | |
|---|---|---|
| 6,766,255 B2 | 7/2004 | Stone |
| 6,823,297 B2 | 11/2004 | Jenny et al. |
| 6,826,520 B1 | 11/2004 | Khan et al. |
| 6,980,940 B1 | 12/2005 | Gurpinar et al. |
| 7,043,367 B2 | 5/2006 | Granjeon |
| 7,177,764 B2 | 2/2007 | Stone |
| 7,225,324 B2 | 5/2007 | Huppenthal et al. |
| 7,254,091 B1 | 8/2007 | Gunning et al. |
| 7,363,163 B2 | 4/2008 | Le Ra Valec-Dupin et al. |
| 7,451,066 B2 | 11/2008 | Edwards et al. |
| 7,478,024 B2 | 1/2009 | Gurpinar et al. |
| 7,496,488 B2 | 2/2009 | Jenny et al. |
| 7,526,418 B2 | 4/2009 | Pita et al. |
| 7,546,229 B2 | 6/2009 | Jenny et al. |
| 7,596,480 B2 | 9/2009 | Fung et al. |
| 7,617,082 B2 | 11/2009 | Childs et al. |
| 7,620,800 B2 | 11/2009 | Huppenthal |
| 7,739,089 B2 | 6/2010 | Gurpinar et al. |
| 7,809,537 B2 | 10/2010 | Hemanthkumar et al. |
| 7,809,538 B2 | 10/2010 | Thomas |
| 7,860,654 B2 | 12/2010 | Stone |
| 7,925,481 B2 | 4/2011 | Van Wagoner et al. |
| 7,953,585 B2 | 5/2011 | Gurpinar et al. |
| 8,190,405 B2 | 5/2012 | Appleyard |
| 8,204,727 B2 | 6/2012 | Dean et al. |
| 8,255,195 B2 | 8/2012 | Yogeswaren |
| 8,359,185 B2 | 1/2013 | Pita et al. |
| 8,428,919 B2 | 4/2013 | Parashkevov |
| 8,433,551 B2 | 4/2013 | Fung et al. |
| 8,452,580 B2 | 5/2013 | Strebelle |
| 8,463,586 B2 | 6/2013 | Mezghani et al. |
| 8,583,411 B2 | 11/2013 | Fung |
| 8,594,986 B2 | 11/2013 | Lunati |
| 8,655,632 B2 | 2/2014 | Moguchaya |
| 8,694,261 B1 | 4/2014 | Robinson |
| 8,776,895 B2 | 7/2014 | Li et al. |
| 8,805,660 B2 | 8/2014 | Guyaguler et al. |
| 8,818,778 B2 | 8/2014 | Salazar-Tio et al. |
| 8,903,694 B2 | 12/2014 | Wallis et al. |
| 9,058,445 B2 | 6/2015 | Usadi et al. |
| 9,187,984 B2 | 11/2015 | Usadi et al. |
| 9,626,466 B2 | 4/2017 | Yang et al. |
| 2008/0234988 A1 | 9/2008 | Chen et al. |
| 2009/0012765 A1* | 1/2009 | Raphael ............ E21B 43/00 703/10 |
| 2009/0138290 A1 | 5/2009 | Holden |
| 2009/0306945 A1 | 12/2009 | Wu et al. |
| 2010/0057413 A1 | 3/2010 | Lee et al. |
| 2010/0185428 A1* | 7/2010 | Vink ............ G01V 99/00 703/10 |
| 2010/0250206 A1 | 9/2010 | Yogeswaren |
| 2010/0312535 A1 | 12/2010 | Chen et al. |
| 2011/0082676 A1 | 4/2011 | Bratvedt et al. |
| 2011/0106135 A1 | 5/2011 | Thompson et al. |
| 2011/0106514 A1 | 5/2011 | Omeragic et al. |
| 2011/0166843 A1* | 7/2011 | Hsu ............ G01V 11/00 703/10 |
| 2011/0313745 A1 | 12/2011 | Mezghani et al. |
| 2012/0082128 A1 | 4/2012 | Kent et al. |
| 2012/0158389 A1 | 6/2012 | Wu et al. |
| 2013/0030782 A1 | 1/2013 | Yogeswaren |
| 2013/0046524 A1 | 2/2013 | Gathogo et al. |
| 2013/0073268 A1 | 3/2013 | Abacioglu et al. |
| 2013/0085730 A1 | 4/2013 | Shaw et al. |
| 2013/0096898 A1 | 4/2013 | Usadi et al. |
| 2013/0096899 A1 | 4/2013 | Usadi et al. |
| 2013/0096900 A1 | 4/2013 | Usadi et al. |
| 2013/0110484 A1 | 5/2013 | Hu et al. |
| 2013/0124161 A1 | 5/2013 | Poudret et al. |
| 2013/0187915 A1 | 7/2013 | Lee et al. |
| 2013/0191091 A1 | 7/2013 | Fung et al. |
| 2013/0211800 A1 | 8/2013 | Fung |
| 2013/0218539 A1 | 8/2013 | Souche |
| 2013/0226540 A1 | 8/2013 | Pita |
| 2013/0246028 A1 | 9/2013 | Hahn et al. |
| 2013/0275106 A1 | 10/2013 | Li et al. |
| 2014/0012557 A1 | 1/2014 | Tarman et al. |
| 2014/0015841 A1 | 1/2014 | Killough |
| 2014/0039853 A1 | 2/2014 | Fung |
| 2014/0136158 A1 | 5/2014 | Hegazy et al. |
| 2014/0168999 A1 | 6/2014 | Li et al. |
| 2014/0222342 A1 | 8/2014 | Robinson |
| 2014/0236559 A1 | 8/2014 | Fung et al. |

OTHER PUBLICATIONS

Chen, Yuguang, et al., (2006), "Efficient Incorporation of Global Effects in Upscaled Models of Two-Phase Flow and Transport in Heterogeneous Formations", *Multiscale Model. Simul.* 5, 445-475.

Darman, N.H., et al., (2002), "Comparison of Two-Phase Dynamic Upscaling Methods Based on Fluid Potentials", *Computational Geosciences*, vol. 6, No. 1, pp. 5-27.

Hewett, Thomas A., et al., (1997), "Archer, Rosalind A., Scale-Averaged Effective Flow Properties for Coarse-Grid Reservoir Simulation", *SPE 37988, SPE Reservoir Simulation Symposium*, Jun. 8-11, 1997, Dallas, Texas.

IP.com, (2010), "Pattern-Based Approach to Multiphase Flow Upscaling Using Distance-Based Modeling", IP.com *Prior Art Database*, pp. 1-6.

Jacks, H. H., et al., (1973), "The Modeling of a Three-Dimensional Reservoir With a Two-Dimensional Reservoir Simulator—The Use of Dynamic Pseudo-functions", *Soc. Pet. Eng. Journal*, pp. 175-185.

Kyte, J. R., et al., (1975), "New Pseudo-functions to Control Numerical Dispersion", *SPE 5105, SPE Journal*, vol. 15, No. 4, pp. 269-276.

Li, Yan, et al., (2007), "An Accurate Multiphase Upscaling for Flow and Transport in Heterogeneous Porous Media", *SPE 105377*, SPE Middle East Oil and Gas Show and Conference, Mar. 11-14, 2007, Kingdom of Bahrain.

Pickup, Gillian E., et al., (1996), "The Scaleup of Two-Phase Flow in Porous Media Using Phase Permeability Tensors", *SPE 28586, SPE Journal*, vol. 1, No. 4, pp. 369-382.

Rasaei, M. Reza, et al., (2009), "Upscaling of the Permeability by Multiscale Wavelet Transformations and Simulation of Multiphase Flows in Heterogeneous Porous Media", *Comput Geosci 13*, pp. 187-214.

Saad, Naji, et al., (1995), "Effective Relative Permeability in Scale-Up and Simulation", *SPE 29592*, Low Permeability Reservoirs Symposium, Mar. 19-22, 1995, Denver, Colorado.

Schlumberger, PSEUDO Reference Manual (2009), pp. 7-14.

Stephen, Karl D., et al. (2008), "Upscaling Uncertainty Analysis in a Shallow-Marine Environment", *Petroleum Geoscience 14*, pp. 71-84.

Suzuki, Koichi, et al. (2002), "Sequential Upscaling Method", *Transport in Porous Media 46*, pp. 179-212.

Wallstrom, T.C., et al., (2002), "Application of Effective Flux Boundary Conditions to Two-Phase Upscaling in Porous Media", *Transport in Porous Media 46*, pp. 155-178.

Wallstrom, T.C., et al., (2002), "Effective Flux Boundary Conditions for Upscaling Porous Media Equations", *Transport in Porous Media 46*, pp. 139-153.

Durlofsky, L. J. (2005) "Upscaling and Gridding of Fine Scale of Geological Models for Flow Simulation", Paper presented at the 8$^{th}$ International Forum of Reservoir Simulation Iles Borromees, Stresa, Italy, Jun. 20-24, 2005. pp. 1-59 Retrieved from Internet address: pangea.stanford.edu/departments/ere/dropbox/SmartFields/SFC_publications/20 05_Durlofsky_upsc_grid_review_ifrs.pdf.

U.S. Prov Appl. No. 62/406,752, Oct. 11 2016, Suzuki.

* cited by examiner

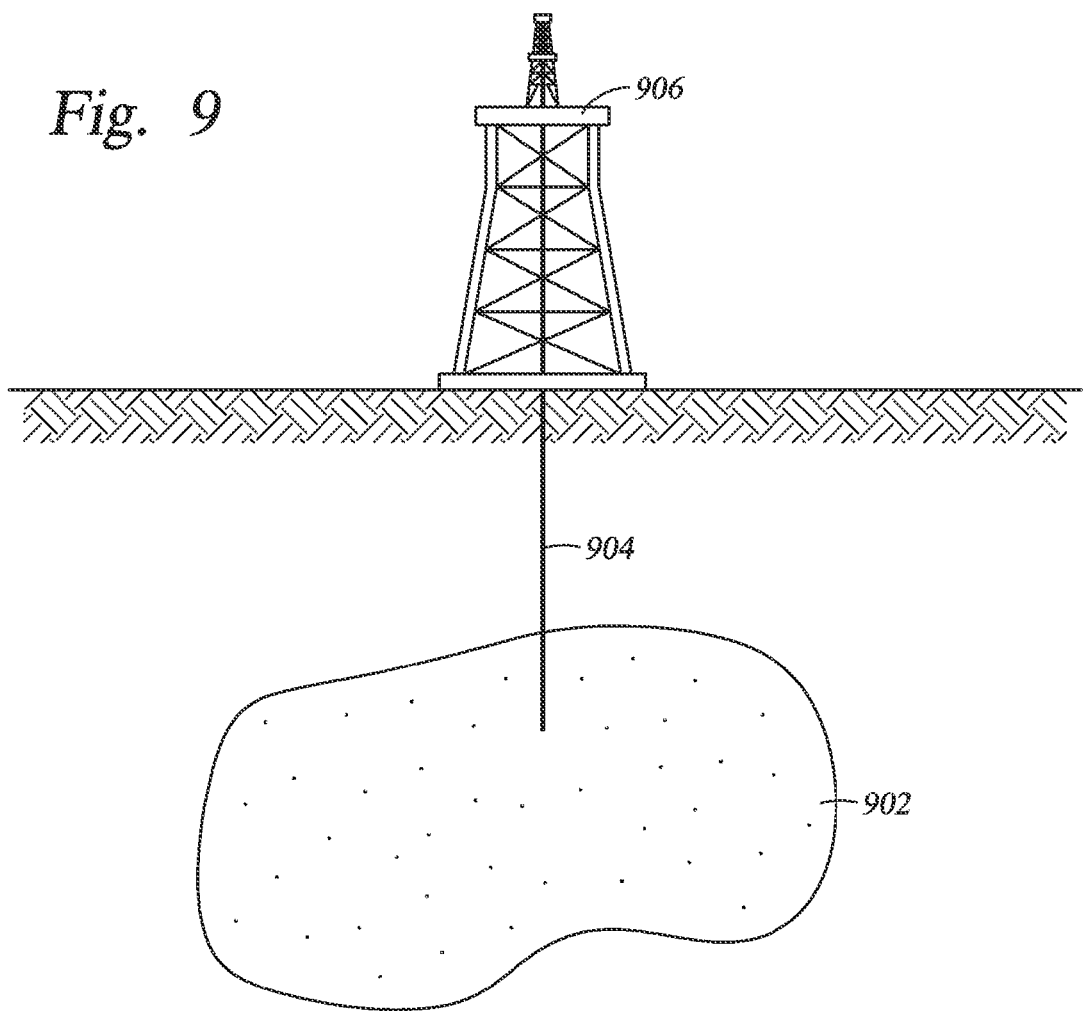

METHOD FOR MULTIPHASE FLOW UPSCALING

CROSS-REFERENCE TO RELATED APPLICATION

This application is a National Stage entry under 35 U.S.C. 371 of PCT/US2013/026913 that published as WO 2013/148021 and was filed 20 Feb. 2013, which claims the benefit of U.S. Provisional Patent Application No. 61/616,807, filed on Mar. 28, 2012 entitled METHOD FOR MULTIPHASE FLOW UPSCALING, each of which is incorporated by reference, in its entirety, for all purposes.

FIELD

The present techniques relate to geologic modeling, and more particularly, to methods of upscaling multiphase flow.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Reservoir models with a highly detailed geological and/or petrophysical description often include a number of gridblocks on the order of 1-10 million. Running a flow simulation on such large models is usually computationally prohibitive. Accordingly, an original geological model with a detailed description, denoted as a 'fine scale model,' should be coarsened to a 'coarse scale model' with much fewer numbers of gridblocks so that the reservoir model can be flow-simulated within a feasible computational time. The coarsening of the reservoir model involves regenerating a grid system, which is denoted as upgridding, and regenerating petrophysical properties (such as porosity and/or permeability) assigned to gridblocks, denoted as upscaling. This upgridding and upscaling should reasonably preserve original understandings of hydrocarbon in-place, estimates of reserves, and predicted production performance of the original fine scale model through the coarsening so as not to mislead business decisions. However, while the preservation of volumetric quantities such as hydrocarbon in-place is relatively straightforward, the preservation of dynamic quantities, such as recovery factors and/or production performance, is not a trivial task. For example, if the mechanism of hydrocarbon recovery is mainly due to displacement of hydrocarbons by other fluids, which are either injected from the surface or are encroaching from an aquifer, simple static calculation of coarse scale petrophysical properties (e.g. weight-averaging of fine scale properties within the coarse gridblock) is not a sufficient upscaling approach to preserve recovery factors and/or production performance. This is because hydrocarbon production due to the injection of displacing fluids (or due to water encroachment from an aquifer) is highly dependent on the efficiency of sweep, which is often controlled not only by large scale geological features but also by the small scale heterogeneity of petrophysical properties. If an important small scale feature of petrophysical heterogeneity is erased or smoothed by upscaling, the efficiency of sweep is miscalculated by the coarse scale flow simulation. To avoid this, upscaling of relative permeability, in addition to the upscaling of absolute permeability, is needed. Relative permeability is a measure of degree of ease of flow of individual phases of fluid, such as hydrocarbon liquid phase (e.g., oil) and aqueous phase (e.g., water), when two or more fluids are flowing simultaneously though porous media. Relative permeability is expressed as a function of phase saturation and is defined as a ratio of permeability of individual phases under multiphase flow condition to absolute permeability under single-phase flow condition. Thus the role of relative permeability in reservoir simulation is to control the amount of fluids of individual phases that flow across a gridblock interface in accordance with the phase saturation at an upstream gridblock.

The most commonly used method for upscaling relative permeability is known as the dynamic pseudo-function method. This method approximates the fine scale simulation of multiphase flow behavior by running a flow simulation on a coarsened model. The method generates and uses upscaled relative permeability as a pseudo-function that accounts for the effect of sub-grid scale heterogeneity on sweep. In other words, the method is a way to upscale rock relative permeability, which is measured by core flooding experiments on a small sample of rock and usually only representing characteristics of multiphase flow through a homogeneous porous medium, to upscale relative permeability that represents characteristics of multiphase flow through heterogeneous medium at the scale of a simulation gridblock. This method can approximate three-dimensional flow simulation using a two-dimensional areal model. However, it is still used as a method for upscaling relative permeability to coarsen a fine scale geologic model to a coarse scale flow simulation model. Numerous variations of dynamic pseudo-function methods have been proposed. One way to classify these variations is based on the boundary conditions used for generating the pseudo-function. Different boundary conditions generate different pseudo-functions for the same model. Each of the existing variations has its own limitations.

Cross-Sectional Simulation Based Method.

This boundary condition was used to reduce a three dimensional simulation model to a two dimensional areal model (i.e., a reservoir model that comprises only 1 layer). Pseudo-functions are generated from a fine scale simulation on a two or three dimensional cross-sectional model that represents a typical vertical cross-section of the reservoir. The limitation of this approach is that it is usually difficult to identify a 'representative' cross-section, if such a cross-section exists at all. This approach has been replaced by global methods as dynamic pseudo generation using full field scale fine simulation ("global methods") became relatively affordable with three dimensional grids. However, because of its simplicity, it is still used occasionally to test new ideas and/or methods.

Global Method.

This boundary condition is supported by commercial software, such as the PSEUDO software package offered by Schlumberger. In this method, dynamic pseudo-functions are generated by post-processing the result of fine scale simulation run at the full field scale, using given well positions and rates. Therefore, the boundary condition used for generating pseudo-functions is the same as the condition that occurs at the simulation gridblocks in the given fine scale simulation. The limitation of this approach is that if well positions and rates are changed, the pseudo-functions should be regenerated by re-running the fine scale simulation. This can be a challenge when running the fine scale simulation is not computationally feasible.

Local Method.

Local methods generate relative permeability pseudo-functions by running two-phase flow simulation on a local domain as depicted in FIG. 1. This method can be seen as a dynamic pseudo-function generation method implemented in such a way that the flow simulation on the local domain mimics core flooding experiments. As shown in FIG. 1, the local domain 100 comprises an upstream coarse grid domain 102 adjacent a downstream coarse grid domain 104. Direction of fluid flow is shown by arrows 105a, 105b. A coarse grid interface 106 defines the interface between the upstream and downstream coarse grid domains. Modeled fluid flow through local domain is shown as shaded squares 107. A pseudo-function is constructed through post-processing of the simulation result by relating displacing phase saturation within the upstream coarse grid domain 102 to the relative permeability calculated from the flux of individual phases flowing across the coarse grid interface 106 and the pressure difference between upstream and downstream coarse grid domains 102, 104.

A typically used boundary condition is a constant pressure boundary condition which imposes constant pressure to the inlet and outlet faces 108, 110 of local domain 100. A displacing phase saturation of $S_d=1.0$ is imposed on inlet face 108 and $S_d=0.0$ is imposed on outlet face 110. A no-flow boundary condition is applied on the sides 112, 114 of local domain 100. The limitation of this approach is the discrepancy between the saturation boundary condition imposed on the local domain and the actual phase saturation that occurs in the related simulation model. The boundary condition of $S_d=1.0$ occurs in actual flow simulations only if the injector is placed in an adjacent simulation gridblock and never happens otherwise.

To overcome this limitation, many boundary condition variations are proposed. The Effective Flux Boundary Condition (EFBC) applies a constant flux boundary condition, instead of constant pressure, on inlet and outlet faces in such a way that the flow rate is allocated to the fine grids in accordance with fine scale permeability on the faces. Although EFBC improves the accuracy of reproduction of fine scale simulation compared to the constant pressure boundary condition, it still fails to capture the flow properties for cases with highly stratified heterogeneity structure. A possible reason is that EFBC still uses saturation boundary condition of $S_d=1.0$ at the inlet face, which is unrealistic.

Local-Global Method.

Local-global methods are proposed to avoid the need of running fine scale simulation at the full field scale. The sequential upscaling method sequentially generates pseudo-functions for simulation gridblocks, from upstream to downstream, using a local method by specifying flux rates of individual phases as an inlet boundary condition, instead of using constant pressure and a saturation boundary condition. The inlet flux rates are carried over from the two-phase simulation result that is previously conducted on the upstream local domain. In other words, the flux boundary condition on the local domain is specified in such a way that outflux of upstream coarse gridblock is the same as influx of downstream coarse gridblock. The limitation of this approach is that pseudo-functions are generated sequentially for all simulation gridblocks individually using a local method, which is computationally prohibitive in real reservoir cases.

A local-global two-phase upscaling method first runs a coarse scale two-phase simulation at the full field scale using rock relative permeability, and then utilizes the simulated coarse scale inter-block flux and saturation as boundary conditions for generating pseudo-functions for individual simulation gridblocks using a local method. If needed, the whole process is iterated by updating relative permeability by the previously generated pseudo-functions. As with the sequential upscaling method, the limitation of this approach is significant computational cost because, to iterate the process, the method requires pseudo generation for all individual simulation gridblocks by running the two-phase flow simulation on individual local domains.

The local-global methods described above rely on global methods and simply attempt to avoid running fine scale simulations at the full field scale. Therefore, the limitations of global methods also apply to local-global methods, i.e. if well positions and rates are changed, the pseudo-functions must be regenerated by re-running the fine scale simulation.

Extended Local Method.

Pickup et al. have proposed to use an extended local boundary condition to generate a pseudo-function as a form of tensor phase permeability. In this approach, which is shown in FIG. 2, the local domain 200 for pseudo-function generation is defined by including both 1) a coarse gridblock domain 202 where the pseudo-function is to be calculated and 2) the coarse gridblocks 204, 206, 208, 210, 212, 214, 216, 218 surrounding coarse gridblock domain 202. In this way, the boundary conditions are not imposed directly on the faces of the coarse gridblock where the pseudo-function is to be calculated. The limitation of this approach is that, because the pseudo-function is generated as a form of tensor—a phase permeability tensor—it should be used by flow simulation using a nine-point flux scheme, which is much more computationally expensive than conventional flow simulation. To use this tensor pseudo-function with conventional flow simulators using a two-point flux scheme, off-diagonal elements of the tensor should be omitted. However, the pseudo-function generated by this method loses the accuracy of reproduction of fine scale simulation if the off-diagonal elements of the tensor are neglected.

What is needed is a local method that solves the problems related to saturation boundary conditions of $S_d=1.0$, imposed on an inlet face of a gridblock, without the need of a tuning parameter or a significant increase in computational cost.

SUMMARY

In one aspect, disclosed aspects and methodologies provide a method of multiphase flow upscaling of a fine scale geologic model. From the fine scale geologic model, a local domain is defined for generating a dynamic pseudo-function. The local domain includes an upstream coarse grid domain adjacent a downstream coarse grid domain, and a concatenated domain adjacent the upstream coarse grid domain. The local domain is configured such that fluid flow to be modeled therethrough flows first through the concatenated domain, then through the upstream coarse grid domain, and lastly through the downstream coarse grid domain. A coarse grid interface is defined between the upstream coarse grid domain and the downstream coarse grid domain. A constant pressure boundary condition of P=1 and a saturation condition of $S_d=1$ are imposed on an upstream face of the concatenated domain. A constant pressure boundary condition of P=0 and a saturation condition of $S_d=0$ are imposed on a downstream face of the downstream coarse grid domain. A no-flow boundary condition is imposed on faces of the concatenated domain, the upstream coarse grid domain, and the downstream coarse grid domain parallel to a direction of fluid flow. Fluid flow is simulated through the local domain for a plurality of time steps until the local domain is completely flooded. At each time step, a fine scale solution of saturation and flow rate of individual fluid phases across the coarse grid interface is recorded. A pseudo-function is constructed by post-processing results of the simulation of fluid flow. The fine scale geologic model is upscaled to a coarse scale geologic model using the pseudo-function.

In another aspect, disclosed methodologies and techniques provide a method of multiphase flow upscaling of a fine scale geologic model. From the fine scale geologic model, a local domain for generating a dynamic pseudo-function is defined. The local domain includes an upstream coarse grid domain adjacent a downstream coarse grid domain, and a concatenated domain adjacent the upstream coarse grid domain. The local domain being configured such that fluid flow to be modeled therethrough flows first through the concatenated domain, then through the upstream coarse grid domain, and lastly through the downstream coarse grid domain. A coarse grid interface is defined between the upstream coarse grid domain and the downstream coarse grid domain. A set of boundary conditions is imposed on an upstream face of the concatenated domain and a downstream face of the downstream coarse grid domain. A no-flow boundary condition is imposed on faces of the concatenated domain, the upstream coarse grid domain, and the downstream coarse grid domain parallel to a direction of fluid flow. Fluid flow is simulated through the local domain for a plurality of time steps until the local domain is completely flooded. At each time step, a fine scale solution of saturation and flow rate of individual fluid phases across the coarse grid interface is recorded. A pseudo-function is constructed by post-processing results of the simulation of fluid flow. The fine scale geologic model is upscaled to a coarse scale geologic model using the pseudo-function.

In another aspect, disclosed methodologies and techniques provide a system for multiphase flow upscaling of a fine scale geologic model, the system comprises a processor, a storage medium, and a computer application accessible by the processor and stored on at least one of the storage medium and the processor. The computer application is adapted to: define, from the fine scale geologic model, a local domain to generate a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain; impose a constant pressure boundary condition of P=1 and a saturation condition of $S_d=1$ on an upstream face of the concatenated domain; impose a constant pressure boundary condition of P=0 and a saturation condition of $S_d=0$ on a downstream face of the downstream coarse grid domain; impose a no-flow boundary condition on faces of the concatenated domain, the upstream coarse grid domain, and the downstream coarse grid domain parallel to a direction of fluid flow; simulate fluid flow through the local domain for a plurality of time steps until the local domain is completely flooded; at each time step, record a fine scale solution of saturation and flow rate of individual fluid phases across the coarse grid interface; construct a pseudo-function by post-processing results of the simulation of fluid flow; and upscale the fine scale geologic model to a coarse scale geologic model using the pseudo-function.

In yet another aspect, disclosed methodologies and techniques provide a computer program product having computer executable logic recorded on a tangible, machine readable medium. The computer program product includes: code for defining, from the fine scale geologic model, a local domain for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain; code for imposing a constant pressure boundary condition of P=1 and a saturation condition of $S_d=1$ on an upstream face of the concatenated domain; code for imposing a constant pressure boundary condition of P=0 and a saturation condition of $S_d=0$ on a downstream face of the downstream coarse grid domain; code for imposing a no-flow boundary condition on faces of the concatenated domain, the upstream coarse grid domain, and the downstream coarse grid domain parallel to a direction of fluid flow; code for simulating fluid flow through the local domain for a plurality of time steps until the local domain is completely flooded; code for recording, at each time step, a fine scale solution of saturation and flow rate of individual fluid phases across the coarse grid interface; code for constructing a pseudo-function by post-processing results of the simulation of fluid flow; and code for upscaling the fine scale geologic model to a coarse scale geologic model using the pseudo-function.

In still another aspect, disclosed methodologies and techniques provide a method of managing hydrocarbon resources. According to the method, a local domain is defined from fine scale geologic model for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain. A constant pressure boundary condition of P=1 and a saturation condition of $S_d=1$ are imposed on an upstream face of the concatenated domain. A constant pressure boundary condition of P=0 and a saturation condition of $S_d=0$ are imposed on a downstream face of the downstream coarse grid domain. A no-flow boundary condition is imposed on faces of the concatenated domain, the upstream coarse grid domain, and the downstream coarse grid domain parallel to a direction of fluid flow. Fluid flow is simulated through the local domain for a plurality of time steps until the local domain is completely flooded. At each time step, a fine scale solution of saturation and flow rate of individual fluid phases across the coarse grid interface is recorded. A pseudo-function is constructed by post-processing results of the simulation of fluid flow. The fine scale geologic model is upscaled to a coarse scale geologic model using the pseudo-function. Hydrocarbon resources are managed using the coarse scale geologic model.

DESCRIPTION OF THE DRAWINGS

Advantages of the present techniques may become apparent upon reviewing the following detailed description and the accompanying drawings in which:

FIG. 9 is a side elevational view of a hydrocarbon reservoir; and

FIG. 10 is a flowchart of a method according to disclosed methodologies and techniques.

DETAILED DESCRIPTION

Figure 1:
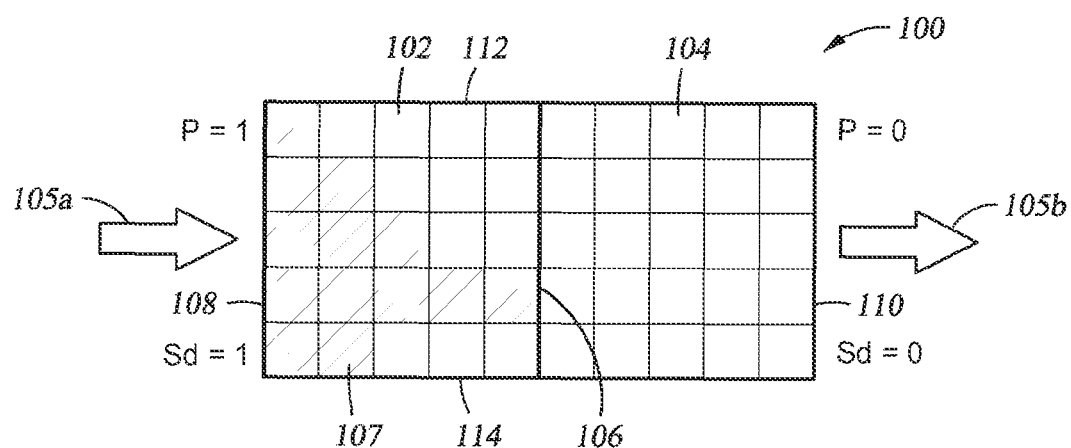
FIG. 1 is a diagram of a local domain taken from a geologic model according to known principles.

In the following detailed description section, specific embodiments are described in connection with preferred embodiments. However, to the extent that the following description is specific to a particular embodiment or a particular use, this is intended to be for exemplary purposes only and simply provides a description of the exemplary embodiments. Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and/or a computer. One or more computer components can reside within a process and/or thread of execution and a computer component can be localized on one computer and/or distributed between two or more computers.

As used herein, the terms "computer-readable medium" or "tangible machine-readable medium" refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

As used herein, "hydrocarbon" includes any hydrocarbon substance, including for example one or more of any of the following: oil (often referred to as petroleum), natural gas, gas condensate, tar and bitumen.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

As used herein, "sweep" includes displacement of hydrocarbon fluids from reservoir rock by flooding or displacing fluids which can be either injected fluid from the surface or from fluid encroaching from an aquifer.

"Efficiency of sweep" includes a fraction or percentage of pore volume where hydrocarbon fluid is flooded or displaced by flooding/displacing fluid in total pore volume of the original hydrocarbon bearing rock.

As used herein, "water cut" includes amount of water in fraction or in percentage in total of produced liquid phase fluid (i.e. oil and water).

As used herein, "porosity" is defined as the relative volume of pore space in a formation or rock.

As used herein, "permeability" is defined as the ability of a rock to transmit fluids through interconnected pores in the rock.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied o these quantities. Unless specifically stated otherwise as apparent from the following discussions, it is appreciated that throughout the present application, discussions using the terms such as "upscaling", "defining", "imposing", "simulating", "recording", "constructing", "post-processing", "outputting", "displaying", or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

Figure 3:
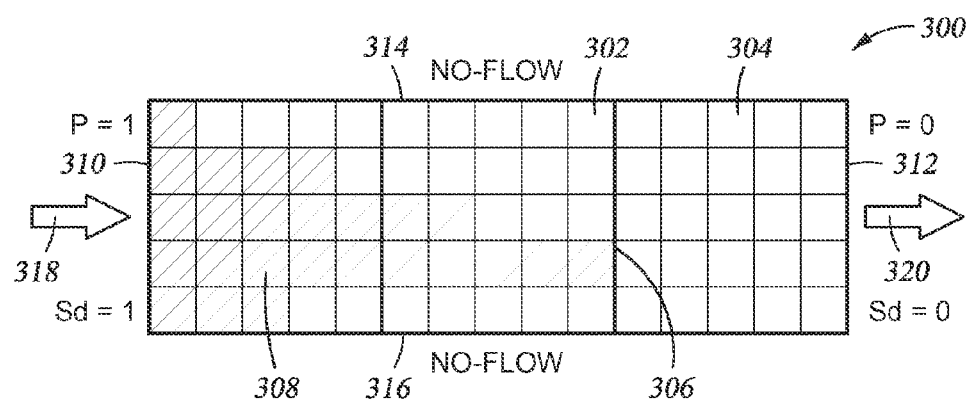
FIG. 3 is a diagram of a local domain taken from a geologic model according to aspects and methodologies disclosed herein.

According to aspects and methodologies disclosed herein, a new local boundary condition for multiphase flow upscaling is used that further improves the accuracy of reproduction of fine scale simulation compared to upscaling results of existing local methods. The new local boundary condition is called upstream outflow flux boundary condition (UOFBC). FIG. 3 depicts the local domain and boundary conditions of UOFBC which can be compared to the existing local domain/boundary condition illustrated in FIG. 1. As shown in FIG. 1, existing local methods impose a constant saturation boundary condition (i.e. $S_d=1.0$) at the inlet face 108 of the simulation gridblock to be upscaled, resulting in overestimation of the average saturation of a displacing fluid at the time of its breakthrough at the inter gridblock face. To avoid this overestimation, UOFBC (in FIG. 3) defines the local domain 300 for generating a pseudo-function as having an upstream gridblock or coarse grid domain 302, a downstream gridblock or coarse grid domain 304, a coarse grid interface 306, and a concatenated gridblock or domain 308 upstream of the upstream coarse grid domain 302 where the pseudo-function is to be calculated. A boundary condition of $S_d=1.0$ is imposed at the inlet face 310 of the local domain 300. Either constant pressure (as depicted in FIG. 3) or constant effective flux rate (as defined in the previously described Effective Flux Boundary Condition) or any other pressure/flux boundary condition can be imposed at inlet face 310. A boundary condition of $S_d=0.0$ is imposed on the outlet face 312 of local domain. A no-flow boundary condition is applied on the sides 314, 316 of local domain 300, or in other words, the no-flow boundary condition is applied on the sides of the coarse grid domains 302, 304, 306 parallel to the direction of fluid flow, as indicated by arrows 318, 320.

Figure 2:
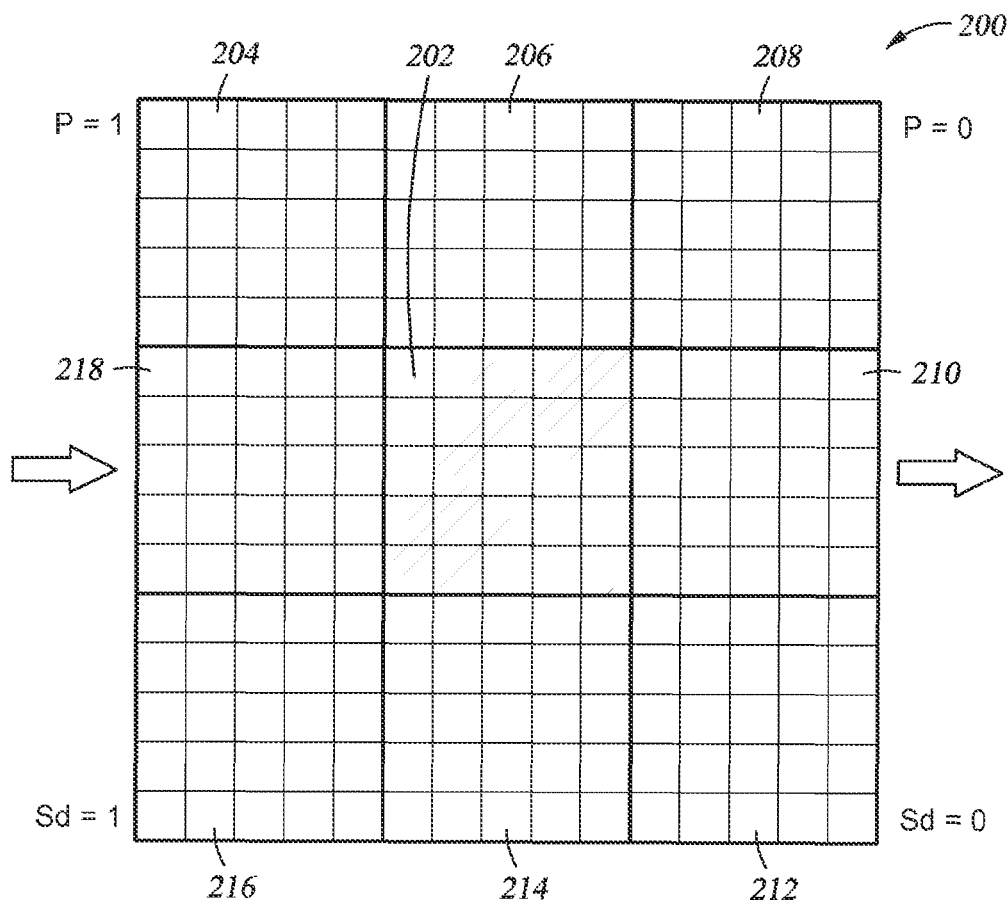
FIG. 2 is a diagram of a local domain taken from a geologic model according to known principles.

By adding concatenated domain 308 to upstream simulation gridblock 302, the inflow flux boundary conditions of the disclosed aspects are similar to the outflow flux boundary conditions of the upstream gridblock in known sequential upscaling methods. However, because the disclosed aspects are designed as a local method, the disclosed aspects do no suffer from the limitations of the sequential upscaling method, which is designed as a local-global method. Specifically, pseudo-functions generated using disclosed aspects are independent of well locations and rate, and the local method using the disclosed aspects does not necessarily require pseudo generation for all individual simulation gridblocks. Thus, the disclosed aspects can avoid computationally prohibitive workflows. Also, the invention avoids imposing a saturation boundary condition of $S_d=1.0$ directly on the faces of the coarse gridblock where the pseudo-function is to be calculated. However, unlike the known extended local method (in FIG. 2), the disclosed aspects do not generate the tensor of pseudo-function, thereby permitting the use of conventional flow simulators using two-point flow approximation.

The improvements of the saturation boundary condition achieved by the disclosed aspects result in a more realistic profile of the displacement front at the subgrid scale than existing local boundary conditions. Although the disclosed aspects depicted in FIG. 3 concatenate a single upstream simulation gridblock to the gridblock where the pseudo-function is to be calculated, it can be extended to the concatenation of multiple gridblocks or the concatenation of only the part of upstream simulation gridblock.

The disclosed aspects and methodologies are similar to known local methods in that they take the same procedure to generate dynamic pseudo-functions as known dynamic pseudo methods that are applicable to local domain. For example, the Kyte and Berry method, a pore volume weighted method or varieties of other methods can be used. Examples of other dynamic methods include a weighted relative permeability method, a vertical equilibrium method, a Stone method, a Kirchoff's Law method, a steady-state simulation method (in Saad et al., 1995), a transmissibility weighted method (in Darman, et al., 2002), and the Hewett and Archer method (in Hewett and Archer, 1997). The procedure to generate pseudo-function using the disclosed aspects (UOFBC) is described hereafter using the Kyte and Berry method and/or the pore volume weighted method as a beginning point.

Consider an example of two-phase flow in a water-oil system in which the displacing fluid is water, the displaced fluid is oil, and $S_d=S_w$. First, a local domain to implement dynamic pseudo generation is extracted from a fine scale geological model as depicted in FIG. 3. This local domain includes a concatenated domain, an upstream coarse grid domain, and a downstream coarse grid domain. The upstream coarse grid domain corresponds to a coarse simulation gridblock where the pseudo-function is to be generated. Specifically, the pseudo-function to be generated from this local domain is expressed as a function of saturation averaged over the upstream coarse grid domain, and describes the upscaled relative permeability to be applied to the interface between the upstream and downstream coarse grid domains. The concatenated domain can be a domain corresponding to either 1) a single coarse simulation gridblock located upstream of the upstream coarse grid domain, 2) multiple coarse gridblocks located upstream of the upstream coarse grid domain, or 3) only some part of a coarse simulation gridblock located upstream of the upstream coarse grid domain.

A constant pressure boundary condition of $P=1$ and a saturation condition of $S_w=1$ are imposed on the upstream face of the concatenated domain. A pressure boundary condition of $P=0$ and a saturation condition of $S_w=0$ is applied to the downstream face of the downstream coarse grid domain. A no-flow boundary condition is imposed on the sides. The local domain is then flow simulated and the fine scale solution of the water saturation and the flow rate of individual phases across the coarse grid interface are recorded at each time step. The flow simulation is continued until the local domain is completely flooded.

Then, a pseudo-function is constructed by post-processing the simulation result. The coarse scale water saturation of the upstream coarse gridblock domain (FIG. 3) is calculated from the fine scale simulation result as:

$$S_w^* = \frac{\sum_i S_{w,i} \phi_i v_i}{\sum_i \phi_i v_i} \quad i \in \text{upstream coarse grid domain,} \quad \text{(Eq. 1)}$$

where
$S_w^*$ is the coarse scale water saturation,
$S_{w,i}$ is the fine scale water saturation at fine gridblock i,
$\phi_i$ is the fine scale porosity at fine gridblock i, and
$v_i$ is the volume of fine gridblock i.

The coarse scale flow rates of oil and water phases across the coarse grid interface (FIG. 3) are obtained as:

$$Q_o^* = \sum_i q_{o,i} \quad i \in \text{coarse grid interface and} \quad \text{(Eq. 2)}$$

$$Q_w^* = \sum_i q_{w,i} \quad i \in \text{coarse grid interface,} \quad \text{(Eq. 3)}$$

where
$Q_o^*$ is the coarse scale flow rate of oil across the coarse grid interface,
$q_o$ is the fine scale flow rate of oil across the coarse grid interface at fine gridblock i,
$Q_w^*$ is the coarse scale flow rate of water across the coarse grid interface, and
$q_w$ is the fine scale flow rate of water across coarse grid interface at fine gridblock i.

The fine scale phase pressures are weight-averaged within the upstream and downstream coarse grid domains as $$p_o^* = \frac{\sum_i w_{o,i} p_{o,i}}{\sum_i w_{o,i}} \quad i \in \quad \text{(Eq. 4)}$$

upstream or downstream coarse grid domain and $$p_w^* = \frac{\sum_i w_{w,i} p_{w,i}}{\sum_i w_{w,i}} \quad i \in \text{upstream or downstream coarse grid domain,} \quad \text{(Eq. 5)}$$

where
$p_o^*$ is the coarse scale oil phase pressure,
$p_{o,i}$ is the fine scale oil phase pressure at fine gridblock i,
$w_{o,i}$ is the weight for the oil phase at fine gridblock i,
$p_w^*$ is the coarse scale water phase pressure,
$p_{w,i}$ is the fine scale water phase pressure at fine gridblock i, and
$w_{w,i}$ is the weight for water phase at fine gridblock i, The weights may be defined in various ways. According to the Kyte and Berry method, described in the Kyte and Berry publication referenced in the bibliography and incorporated herein by reference, the weights are defined as $$w_{o,i} = k_{ro,i} k_i v_i, \; w_{w,i} = k_{rw,i} k_i v_i \quad \text{(Eq. 6),}$$

where $k_i$ is the absolute permeability at fine gridblock i. According to the pore volume weighted method, the weights are defined as $$w_{o,i} = w_{w,i} = \phi_i v_i \quad \text{(Eq. 7).}$$

Coarse scale relative permeability may be calculated from coarse scale properties using Darcy's law as;

$$k_{ro}^* = \frac{\mu_o B_o Q_o^*}{T^* \Delta p_o^*} \text{ and} \quad \text{(Eq. 8)}$$

$$k_{rw}^* = \frac{\mu_w B_w Q_w^*}{T^* \Delta p_w^*}, \quad \text{(Eq. 9)}$$

where
$k_{ro}^*$ is the coarse scale oil relative permeability,
$\mu_o$ is the oil viscosity,
$B_o$ is an oil formation volume factor,
$\Delta p_o^*$ is the difference of oil phase pressure between upstream and downstream coarse gridblocks,
$T^*$ is the absolute transmissibility between coarse gridblocks,
$k_{rw}^*$ is the coarse scale water relative permeability,
$\mu_w$ is the water viscosity,
$B_w$ is a water formation volume factor, and
$\Delta p_w^*$ is the difference in oil phase pressure between upstream and downstream coarse gridblocks.

Absolute transmissibility between coarse gridblocks, $T^*$, may be obtained from single-phase upscaling. The pseudo-function is constructed by relating Equations 1, 8 and 9 corresponding to the same simulation time.

Figure 4A:
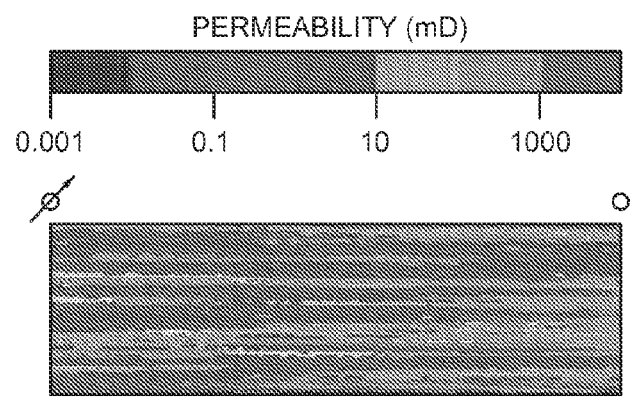
FIG. 4A is an input of a flow simulation of a fine scale model.
Figure 4B:
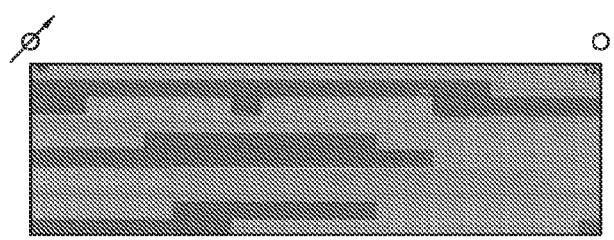
FIGS. 4B and 4C are inputs of flow simulations of coarse scale models according to aspects and methodologies disclosed herein.
Figure 4C:
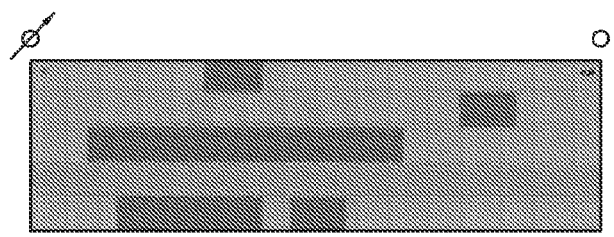

FIGS. 4A-4C demonstrate the use of the disclosed aspects and methodologies (UOFBC) using a synthetic two-dimensional cross-sectional model. The fine scale model depicted in FIG. 4A consists of a model of 200×100 gridblocks with a grid size of 10 meters×100 meters in the horizontal plane and 2 feet (0.61 meters) in the vertical direction. This fine scale model is coarsened to two different coarse scale models: the ten layer model 402 of FIG. 4B and the five layer model 404 of FIG. 4C. The ten layer model 402, upgridded by uniform coarsening, comprises 20×10 gridblocks with a grid size of 100 meters×100 meters in the horizontal plane and 20 feet (6.1 meters) in the vertical direction. The five layer model 404 consists of 20×5 gridblocks with a grid size of 100 meters×100 meters in the horizontal plane and 40 feet (12.2 meters) in the vertical plane. Water flooding, modeled by placing an injector on the left and a producer on the right, is considered as a recovery method. A constant water injection rate and a constant total liquid production rate are imposed as well constraints so the simulated pressure behavior of each coarse scale model remains almost identical to that of fine scale model regardless of the methods for multiphase upscaling. This is because of the fixed material balance of the total liquid phase fluid. The dimension of the model is 2000 meters×100 meters×200 feet (61 meters). FIGS. 4A-4D depict the permeability distribution of the fine scale model and the two coarse scale models.

Figure 5A:
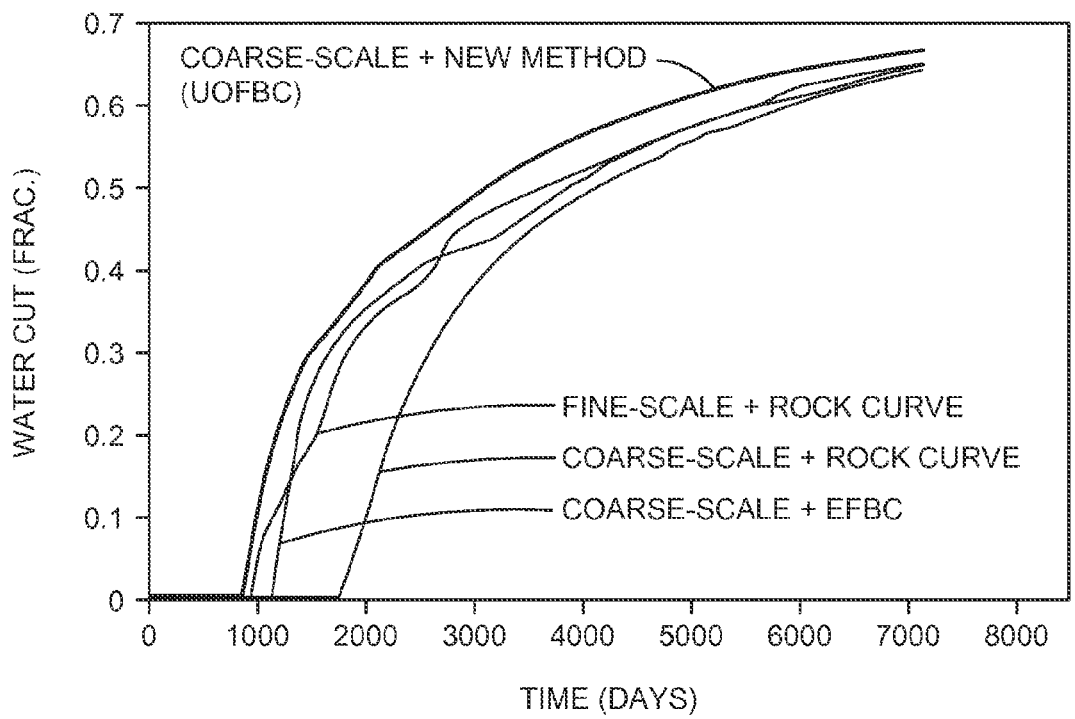
FIGS. 5A and 5B are graphs comparing various methods of flow simulation using the coarse scale models of FIGS. 4B and 4C, respectively.
Figure 5B:
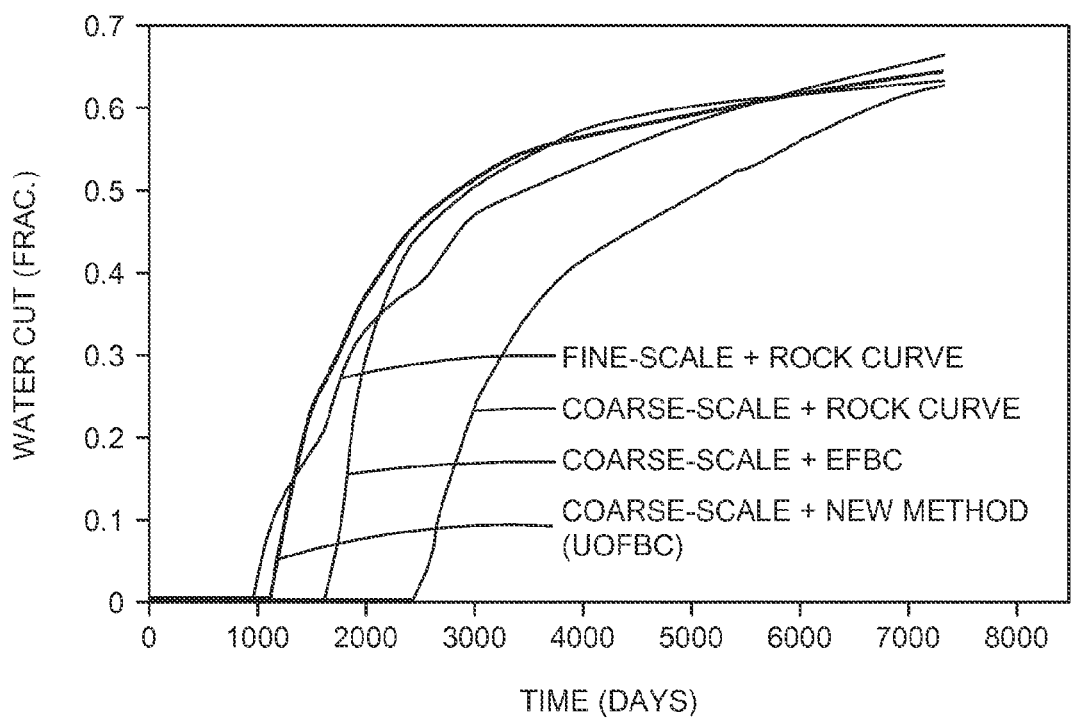

To demonstrate advantages of the disclosed aspects and methodologies, the simulations of FIGS. 4A-4C are compared against an existing local method (EFBC, as discussed in Wallstrom & Christie, 2002 and Wallstrom and Hu, 2002). Specifically, FIGS. 5A and 5B compare the simulated water cut for the ten layer model and the five layer model, respectively, using a fine scale model with rock relative permeability (reference number 502), a coarse scale model with pseudo-functions generated using EFBC (reference number 504), a coarse scale model with pseudo-functions generated using aspects disclosed herein (UOFBC) (reference number 506), and a coarse scale model with rock relative permeability (reference number 508). As depicted in FIG. 5A, both EFBC and UOFBC sufficiently reproduce fine scale simulation for the ten layer model. However, when the simulation layers are further coarsened to the five layer model, FIG. 5B demonstrates that EFBC fails to capture fine scale flow properties while UOFBC is still in good agreement with the fine scale solution. UOFBC as disclosed herein is particularly effective when subgrid scale reservoir heterogeneity exhibits a highly stratified structure (e.g., heterolithic facies) as seen in this test result.

The concatenated domain depicted in FIG. 3 corresponds to a domain of single coarse simulation gridblock, but may be extended to include multiple coarse gridblocks. Similarly, the concatenated domain may be defined to include only some part of the upstream coarse simulation gridblock. However, as the size of the concatenated domain increases, the computational cost of dynamic pseudo-function generation increases. Numerical experiments indicate that the pseudo-function generated using this invention quickly converges with the increase in the size of concatenated domain. In other words, the pseudo-function generated by concatenating one coarse gridblock is similar to the pseudo-function generated by concatenating two coarse gridblocks in many cases. Thus the concatenation of multiple coarse gridblocks might be a less desirable approach. Also, if only some part of the upstream coarse simulation gridblock is concatenated and if the size of the concatenated domain is not extensive enough, the quality of the generated pseudo-function would be deteriorated.

The effect of the type of pressure or flux boundary condition on the dynamic pseudo-function generated using this invention appears to be less significant compared to existing local methods, such as that shown in FIG. 1. This is because, if the disclosed aspects and methodologies are implemented, the pressure or flux boundary condition is not imposed directly on the coarse grid domain where the pseudo-function is to be generated. Although the boundary condition of FIG. 3 uses a constant pressure boundary condition (i.e. P=1 on the inlet face and P=0 on the outlet face), any other pressure boundary condition or flux boundary condition, such as EFBC, can also be used.

Figure 6:
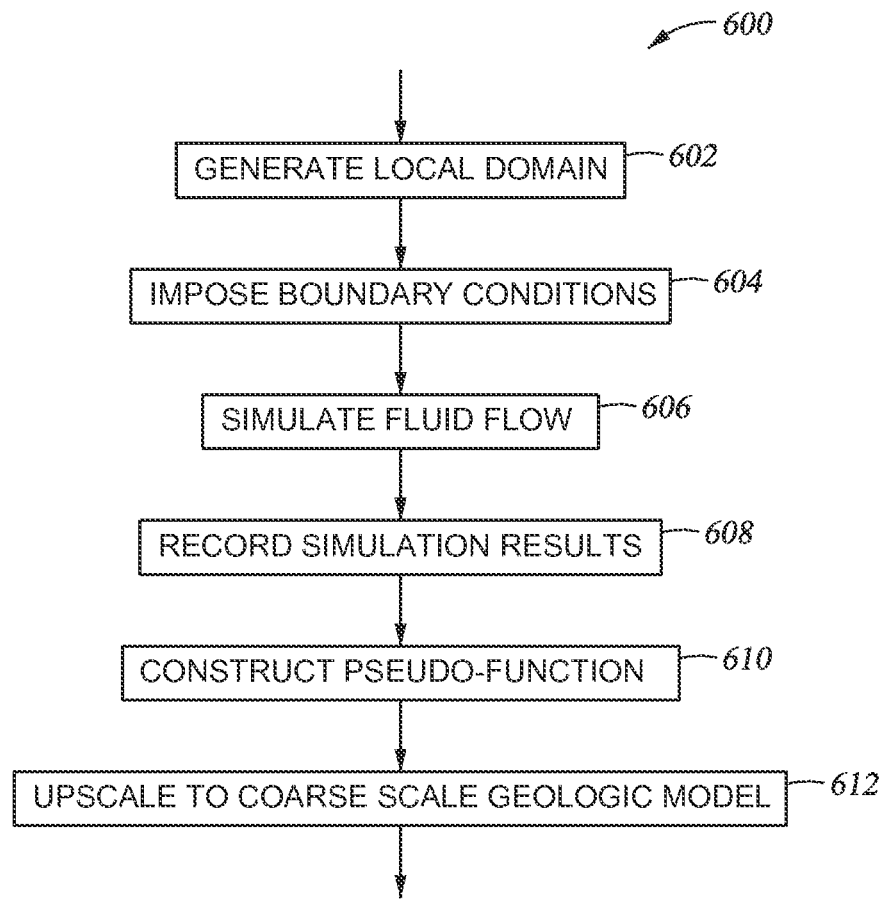
FIG. 6 is a flowchart of a method according to disclosed aspects and methodologies.

FIG. 6 is a flowchart of a method 600 according to aspects and methodologies disclosed herein. Method 600 is a method of multiphase flow upscaling of a fine scale geologic model used in hydrocarbon management activities. At block 602 a local domain for generating a dynamic pseudo-function is defined from the fine scale geologic model. The local domain includes an upstream coarse grid domain adjacent a downstream coarse grid domain, and a concatenated domain adjacent the upstream coarse grid domain. The local domain is configured such that fluid flow to be modeled therethrough flows first through the concatenated domain, then through the upstream coarse grid domain, and lastly through the downstream coarse grid domain. A coarse grid interface is defined between the upstream coarse grid domain and the downstream coarse grid domain. At block 604 boundary conditions are imposed on portions of the local domain. For example, a constant pressure boundary condition of P=1 and a saturation condition of $S_d=1$ may be imposed on an upstream face of the concatenated domain. A constant pressure boundary condition of P=0 and a saturation condition of $S_d=0$ may be imposed on a downstream face of the downstream coarse grid domain. A no-flow boundary condition may be imposed on faces of the concatenated domain, the upstream coarse grid domain, and the downstream coarse grid domain parallel to a direction of fluid flow. At block 606 fluid flow is simulated through the local domain for a plurality of time steps until the local domain is completely flooded. At block 608 a fine scale solution of saturation and flow rate of individual fluid phases across the coarse grid interface is recorded at each time step. At block 610 a pseudo-function is constructed by post-processing results of the simulation of fluid flow. At block 612 the fine scale geologic model is upscaled to a coarse scale geologic model using the pseudo-function. The coarse scale geologic model may be outputted to a display, a computer storage medium, a printout, and/or to another simulation program.

Figure 7:
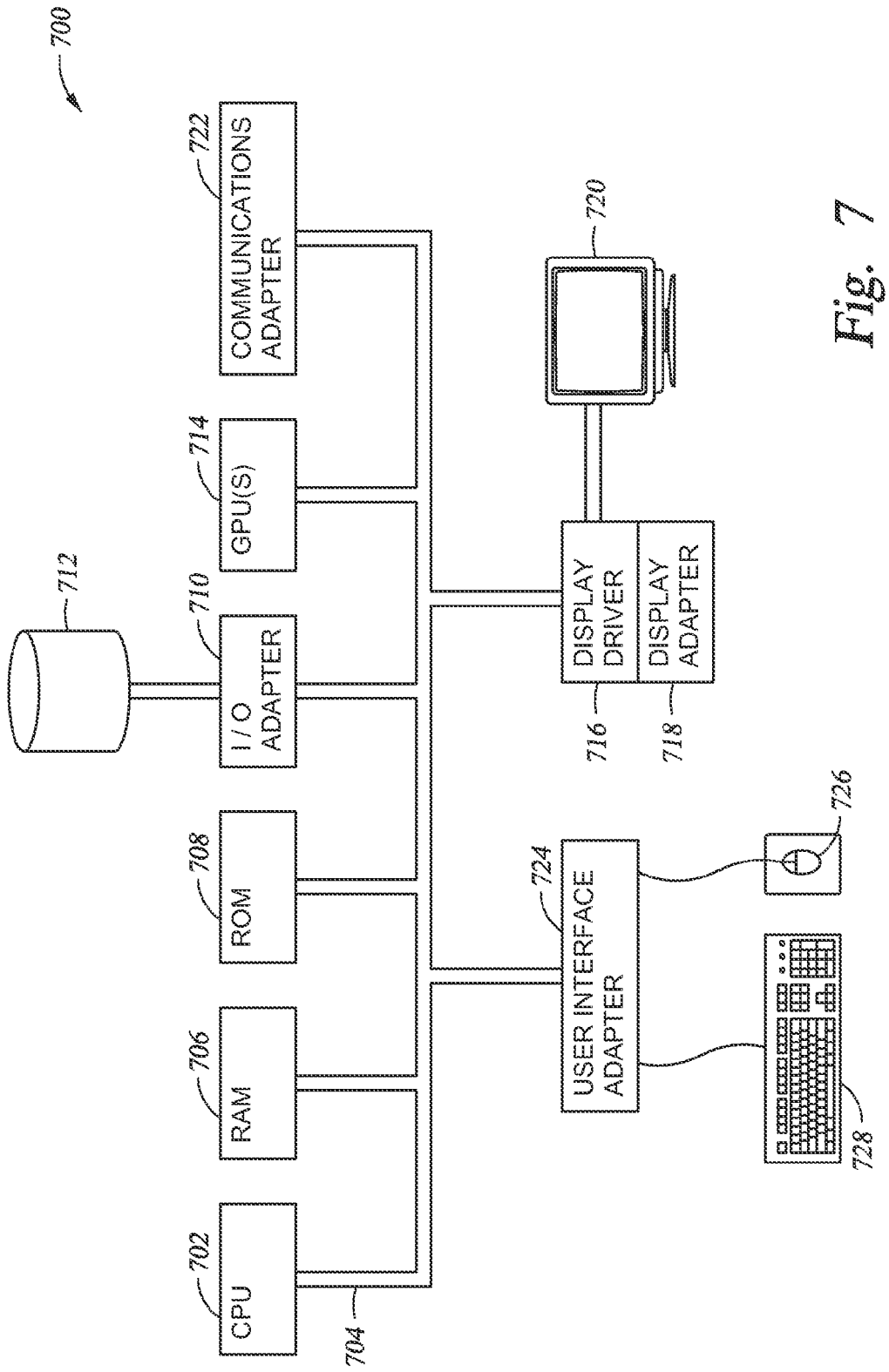
FIG. 7 is a block diagram of a computing system used to perform disclosed aspects and methodologies.

FIG. 7 is a block diagram of a computer system 700 that may be used to perform any of the methods disclosed herein. A central processing unit (CPU) 702 is coupled to system bus 704. The CPU 702 may be any general-purpose CPU, although other types of architectures of CPU 702 (or other components of exemplary system 700) may be used as long as CPU 702 (and other components of system 700) supports the inventive operations as described herein. The CPU 702 may execute the various logical instructions according to disclosed aspects and methodologies. For example, the CPU 702 may execute machine-level instructions for performing processing according to aspects and methodologies disclosed herein.

The computer system 700 may also include computer components such as a random access memory (RAM) 706, which may be SRAM, DRAM, SDRAM, or the like. The computer system 700 may also include read-only memory (ROM) 708, which may be PROM, EPROM, EEPROM, or the like. RAM 706 and ROM 708 hold user and system data and programs, as is known in the art. The computer system 700 may also include an input/output (I/O) adapter 710, a communications adapter 722, a user interface adapter 724, and a display adapter 718. The I/O adapter 710, the user interface adapter 724, and/or communications adapter 722 may, in certain aspects and techniques, enable a user to interact with computer system 700 in order to input information.

The I/O adapter 710 preferably connects a storage device(s) 712, such as one or more of hard drive, compact disc (CD) drive, floppy disk drive, tape drive, etc. to computer system 700. The storage device(s) may be used when RAM 706 is insufficient for the memory requirements associated with storing data for operations of embodiments of the present techniques. The data storage of the computer system 700 may be used for storing information and/or other data used or generated as disclosed herein. The communications adapter 722 may couple the computer system 700 to a network (not shown), which may enable information to be input to and/or output from system 700 via the network (for example, the Internet or other wide-area network, a local-area network, a public or private switched telephony network, a wireless network, any combination of the foregoing). User interface adapter 724 couples user input devices, such as a keyboard 728, a pointing device 726, and the like, to computer system 700. The display adapter 718 is driven by the CPU 702 to control, through a display driver 716, the display on a display device 720. Information and/or representations of one or more 2D canvases and one or more 3D windows may be displayed, according to disclosed aspects and methodologies.

The architecture of system 700 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

Figure 8:
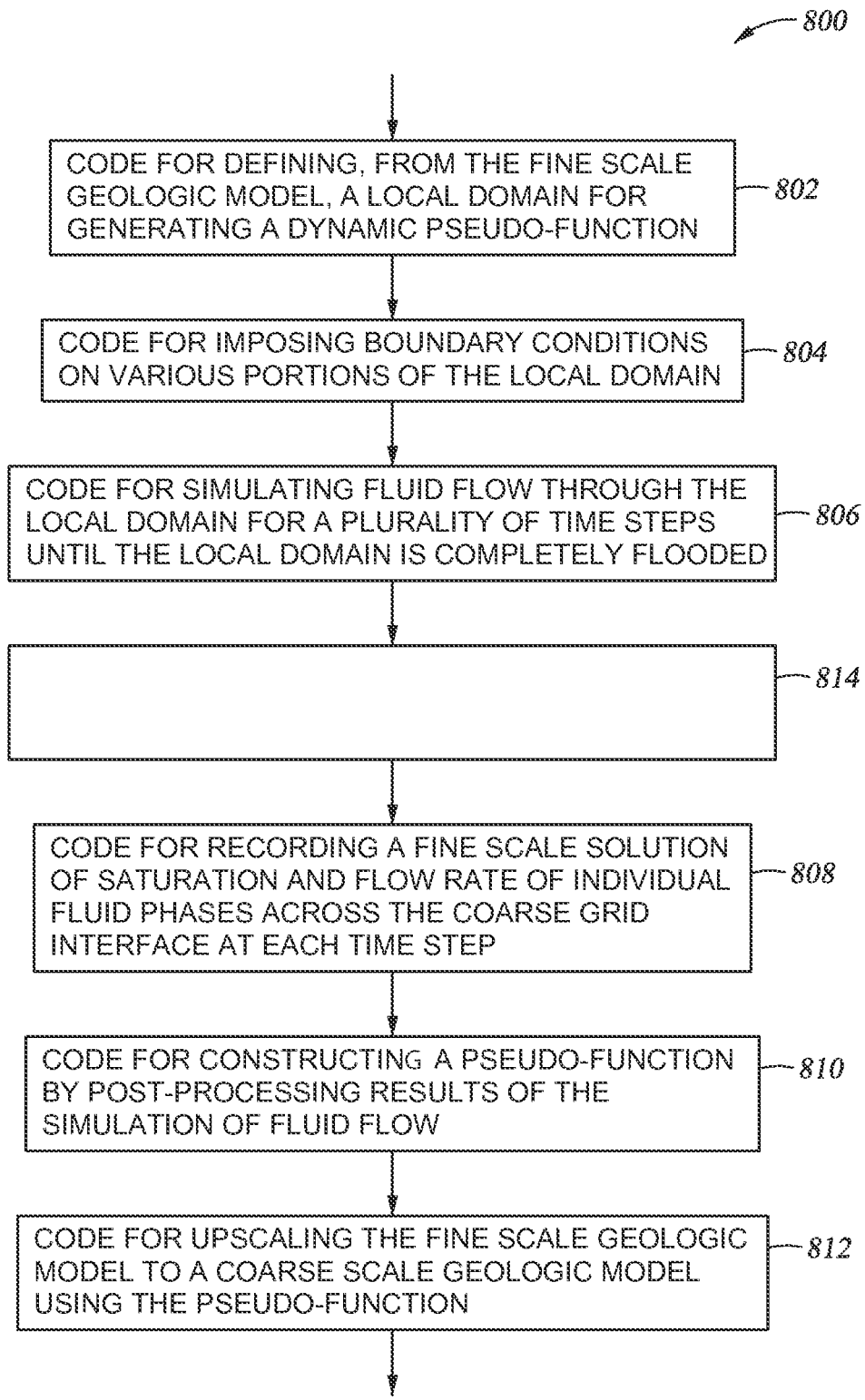
FIG. 8 is a block diagram representing computer code according to disclosed methodologies and techniques.

FIG. 8 shows a representation of machine-readable logic or code 800 that, when executed, performs a method of multiphase flow upscaling of a fine scale geologic model. Code 800 may be used or executed with a computing system such as computing system 700. At block 802 code is provided for defining, from the fine scale geologic model, a local domain for generating a dynamic pseudo-function. The local domain includes adjacent upstream and downstream coarse grid domains, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain. A coarse grid interface is defined between the upstream coarse grid domain and the downstream coarse grid domain. At block 804 code is provided for imposing boundary conditions on various portions of the local domain. For example, a constant pressure boundary condition of P=1 and a saturation condition of $S_d=1$ may be imposed on an upstream face of the concatenated domain. A constant pressure boundary condition of P=0 and a saturation condition of $S_d=0$ may be imposed on a downstream face of the downstream coarse grid domain. A no-flow boundary condition may be imposed on faces of the concatenated domain, the upstream coarse grid domain, and the downstream coarse grid domain parallel to a direction of fluid flow. At block 806 code is provided for simulating fluid flow through the local domain for a plurality of time steps until the local domain is completely flooded. At block 808 code is provided for recording a fine scale solution of saturation and flow rate of individual fluid phases across the coarse grid interface at each time step. At block 810 code is provided for constructing a pseudo-function by post-processing results of the simulation of fluid flow. At block 812 code is provided for upscaling the fine scale geologic model to a coarse scale geologic model using the pseudo-function. Code effectuating or executing other features of the disclosed aspects and methodologies may be provided as well. This additional code is represented in FIG. 8 as block 814, and may be placed at any location within code 800 according to computer code programming techniques.

Aspects disclosed herein may be used to perform hydrocarbon management activities such as extracting hydrocarbons from a subsurface formation, region, or reservoir, which is indicated by reference number 902 in FIG. 9. A method 1000 of extracting hydrocarbons from subsurface reservoir 902 is shown in FIG. 10. At block 1002 inputs are received from a numerical model, geologic model, or flow simulation of the subsurface region, where the model or simulation has been run or improved using the methods and aspects disclosed herein. At block 1004 the presence and/or location of hydrocarbons in the subsurface region is predicted. At block 1006 hydrocarbon extraction is conducted to remove hydrocarbons from the subsurface region, which may be accomplished by drilling a well 904 using oil drilling equipment 906 (FIG. 9). Other hydrocarbon management activities may be performed according to known principles.

Illustrative, non-exclusive examples of methods and products according to the present disclosure are presented in the following non-enumerated paragraphs. It is within the scope of the present disclosure that an individual step of a method recited herein, including in the following enumerated paragraphs, may additionally or alternatively be referred to as a "step for" performing the recited action.

A. A method of multiphase flow upscaling of a fine scale geologic model, comprising:

from the fine scale geologic model, defining a local domain for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;

imposing a constant pressure boundary condition of P=1 and a saturation condition of $S_d=1$ on an upstream face of the concatenated domain;

imposing a constant pressure boundary condition of P=0 and a saturation condition of $S_d=0$ on a downstream face of the downstream coarse grid domain;

imposing a no-flow boundary condition on faces of the concatenated domain, the upstream coarse grid domain, and the downstream coarse grid domain parallel to a direction of fluid flow;

simulating fluid flow through the local domain for a plurality of time steps until the local domain is completely flooded;

at each time step, recording a fine scale solution of saturation and flow rate of individual fluid phases across the coarse grid interface;

constructing a pseudo-function by post-processing results of the simulation of fluid flow; and upscaling the fine scale geologic model to a coarse scale geologic model using the pseudo-function.

A1. The method according to paragraph A, wherein the upstream coarse grid domain corresponds to a domain of a gridblock of a coarse scale geologic model where the pseudo-function is to be generated.

A2. The method according to any of paragraphs A-A1, wherein the concatenated domain is a domain of a gridblock of a coarse scale geologic model.

A3. The method according to any of paragraphs A-A1, wherein the concatenated domain is a domain of a plurality of gridblocks of a coarse scale geologic model.

A4. The method according to any of paragraphs A-A1, wherein the concatenated domain is a domain of a portion of a gridblock of a coarse scale geologic model.

A5. The method according to any of paragraphs A-A4, wherein constructing the pseudo-function uses a dynamic method.

A6. The method according to any of paragraphs A-A5, wherein the dynamic method is a pore volume weighted method.

A7. The method according to any of paragraphs A-A5, wherein the dynamic method is a Kyte and Berry method.

A8. The method according to any of paragraphs A-A5, wherein the dynamic method comprises one of a weighted relative permeability method, a vertical equilibrium (VE) method, a Stone method, a Kirchoff's Law method, a steady-state simulation method, a transmissibility weighted method, and a Hewett and Archer method.

A9. The method according to any of paragraphs A-A8, further comprising:
predicting at least one of a presence, location, and amount of hydrocarbons in the subsurface formation; and
managing hydrocarbons in the subsurface formation based on said prediction.

B. A method of multiphase flow upscaling of a fine scale geologic model, comprising:
from the fine scale geologic model, defining a local domain for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;
imposing a set of boundary conditions on an upstream face of the concatenated domain and a downstream face of the downstream coarse grid domain;
imposing a no-flow boundary condition on faces of the concatenated domain, the upstream coarse grid domain, and the downstream coarse grid domain parallel to a direction of fluid flow;
simulating fluid flow through the local domain for a plurality of time steps until the local domain is completely flooded;
at each time step, recording a fine scale solution of saturation and flow rate of individual fluid phases across the coarse grid interface;
constructing a pseudo-function by post-processing results of the simulation of fluid flow; and
upscaling the fine scale geologic model to a coarse scale geologic model using the pseudo-function.

B1. The method according to paragraph B, wherein the set of boundary conditions comprises a flux rate boundary condition.

B2. The method according to any of paragraphs B-B1, wherein the set of boundary conditions comprises a pressure boundary condition.

B3. The method according to any of paragraphs B-B2, wherein the upstream coarse grid domain corresponds to a domain of a gridblock of a coarse scale geologic model where the pseudo-function is to be generated.

B4. The method according to any of paragraphs B-B3, wherein the concatenated domain is a domain of a gridblock of a coarse scale geologic model.

B5. The method according to any of paragraphs B-B4, wherein constructing the pseudo-function uses a dynamic method.

B6. The method according to any of paragraphs B-B5, wherein the dynamic method is a pore volume weighted method.

B7. The method according to any of paragraphs B-B5, wherein the dynamic method is a Kyte and Berry method.

B8. The method according to any of paragraphs B-B7, further comprising:
predicting at least one of a presence, location, and amount of hydrocarbons in the subsurface formation; and
managing hydrocarbons in the subsurface formation based on said prediction.

C. A system for multiphase flow upscaling of a fine scale geologic model, the system comprising:
a processor;
a storage medium; and
a computer application accessible by the processor and stored on at least one of the storage medium and the processor, the computer application adapted to:
from the fine scale geologic model, define a local domain to generate a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;
impose a constant pressure boundary condition of $P=1$ and a saturation condition of $S_d=1$ on an upstream face of the concatenated domain;
impose a constant pressure boundary condition of $P=0$ and a saturation condition of $S_d=0$ on a downstream face of the downstream coarse grid domain;
impose a no-flow boundary condition on faces of the concatenated domain, the upstream coarse grid domain, and the downstream coarse grid domain parallel to a direction of fluid flow;
simulate fluid flow through the local domain for a plurality of time steps until the local domain is completely flooded;
at each time step, record a fine scale solution of saturation and flow rate of individual fluid phases across the coarse grid interface;
construct a pseudo-function by post-processing results of the simulation of fluid flow; and
upscale the fine scale geologic model to a coarse scale geologic model using the pseudo-function.

D. A computer program product having computer executable logic recorded on a tangible, machine readable medium, the computer program product comprising:
code for defining, from the fine scale geologic model, a local domain for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;
code for imposing a constant pressure boundary condition of $P=1$ and a saturation condition of $S_d=1$ on an upstream face of the concatenated domain;
code for imposing a constant pressure boundary condition of $P=0$ and a saturation condition of $S_d=0$ on a downstream face of the downstream coarse grid domain;
code for imposing a no-flow boundary condition on faces of the concatenated domain, the upstream coarse grid domain, and the downstream coarse grid domain parallel to a direction of fluid flow;
code for simulating fluid flow through the local domain for a plurality of time steps until the local domain is completely flooded;
code for recording, at each time step, a fine scale solution of saturation and flow rate of individual fluid phases across the coarse grid interface;
code for constructing a pseudo-function by post-processing results of the simulation of fluid flow; and code for upscaling the fine scale geologic model to a coarse scale geologic model using the pseudo-function.

E. A method of managing hydrocarbon resources, comprising:

from a fine scale geologic model, defining a local domain for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;

imposing a constant pressure boundary condition of P=1 and a saturation condition of $S_d=1$ on an upstream face of the concatenated domain;

imposing a constant pressure boundary condition of P=0 and a saturation condition of $S_d=0$ on a downstream face of the downstream coarse grid domain;

imposing a no-flow boundary condition on faces of the concatenated domain, the upstream coarse grid domain, and the downstream coarse grid domain parallel to a direction of fluid flow;

simulating fluid flow through the local domain for a plurality of time steps until the local domain is completely flooded;

at each time step, recording a fine scale solution of saturation and flow rate of individual fluid phases across the coarse grid interface;

constructing a pseudo-function by post-processing results of the simulation of fluid flow;

upscaling the fine scale geologic model to a coarse scale geologic model using the pseudo-function; and managing hydrocarbon resources using the coarse scale geologic model.

E1. The method according to paragraph E, wherein managing hydrocarbon resources comprises extracting hydrocarbons from a subsurface region.

BIBLIOGRAPHY

Kyte, J. R., Berry, D. W., New Pseudo-functions To Control Numerical Dispersion, SPE 5105, SPE Journal, Volume 15, Number 4, 269-276 (1975).

Jacks, H. H., Smith, O. J. and Mattax, C. C., The Modeling of a Three-Dimensional Reservoir With a Two-Dimensional Reservoir Simulator—The Use of Dynamic Pseudo-functions, Soc. Pet. Eng. Journal, 175-185 (1973).

Hewett, Thomas A., Archer, Rosalind A., Scale-Averaged Effective Flow Properties for Coarse-Grid Reservoir Simulation, SPE 37988, SPE Reservoir Simulation Symposium, 8-11 Jun. 1997, Dallas, Tex.

N. H. Darman, G. E. Pickup and K. S. Sorbie, Comparison of Two-Phase Dynamic Upscaling Methods Based on Fluid Potentials, Computational Geosciences, Volume 6, Number 1, 5-27, DOI: 10.1023/A:1016572911992 (2002).

Schlumberger, PSEUDO Reference Manual (2009), pp. 7-14.

Yuguang Chen and Yan Li, Local-Global Two-Phase Upscaling of Flow and Transport in Heterogeneous Formations, Multiscale Model. Simul. 8, pp. 125-153 (2009).

T. C. Wallstrom, M. A. Christie, L. J. Durlofsky and D. H. Sharp, Effective Flux Boundary Conditions for Upscaling Porous Media Equations, Transport in Porous Media 46: 139-153 (2002).

T. C. Wallstrom, S. Hou, M. A. Christie, L. J. Durlofsky and D. H. Sharp, et al., Application of Effective Flux Boundary Conditions to Two-Phase Upscaling in Porous Media, Transport in Porous Media 46: 155-178 (2002).

Yan Li, Yalchin Efendiev, Richard E. Ewing, and Guan Qin, and Xiao-Hui Wu, An Accurate Multiphase Upscaling for Flow and Transport in Heterogeneous Porous Media, SPE 105377, SPE Middle East Oil and Gas Show and Conference, 11-14 Mar. 2007, Kingdom of Bahrain.

Saad, Naji, Cullick, A. S., Honarpour, M. M., Effective Relative Permeability in Scale-Up and Simulation, SPE 29592, Low Permeability Reservoirs Symposium, 19-22 Mar. 1995, Denver, Colo.

Koichi Suzuki and Thomas A. Hewett, Sequential Upscaling Method, Transport in Porous Media 46: 179-212 (2002).

Chen et al., Upscaling of Flow and Transport Parameters for Simulation of Fluid Flow in Subsurface Reservoirs, Pat. US2010/0312535 A1 (2010).

Yuguang Chen and Louis J. Durlofsky, Efficient Incorporation of Global Effects in Upscaled Models of Two-Phase Flow and Transport in Heterogeneous Formations, Multiscale Model. Simul. 5, 445-475 (2006).

Gillian E. Pickup and Kenneth S. Sorbie, The Scaleup of Two-Phase Flow in Porous Media Using Phase Permeability Tensors, SPE 28586, SPE Journal, Volume 1, Number 4, 369-382 (1996).

What is claimed is:

1. A method of multiphase flow upscaling of a fine scale geologic model, comprising:

from the fine scale geologic model, defining a local domain for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;

imposing a constant pressure boundary condition of P=1 and a saturation condition of $S_d=1$ on an upstream face of the concatenated domain;

imposing a constant pressure boundary condition of P=0 and a saturation condition of $S_d=0$ on a downstream face of the downstream coarse grid domain;

imposing a no-flow boundary condition on faces of the concatenated domain, the upstream coarse grid domain, and the downstream coarse grid domain parallel to a direction of fluid flow;

simulating fluid flow through the local domain for a plurality of time steps until the local domain is completely flooded;

at each time step, recording a fine scale solution of saturation and flow rate of individual fluid phases across the coarse grid interface;

constructing a pseudo-function by post-processing results of the simulation of fluid flow; and upscaling the fine scale geologic model to a coarse scale geologic model using the pseudo-function.

2. The method of claim 1, wherein the upstream coarse grid domain corresponds to a domain of a gridblock of a coarse scale geologic model where the pseudo-function is to be generated.

3. The method of claim 1, wherein the concatenated domain is a domain of a gridblock of a coarse scale geologic model.

4. The method of claim 1, wherein the concatenated domain is a domain of a plurality of gridblocks of a coarse scale geologic model.

5. The method of claim 1, wherein the concatenated domain is a domain of a portion of a gridblock of a coarse scale geologic model.

6. The method of claim 1, wherein constructing the pseudo-function uses a dynamic method.

7. The method of claim 6, wherein the dynamic method is a pore volume weighted method.

8. The method of claim 6, wherein the dynamic method is a Kyte and Berry method.

9. The method of claim 6, wherein the dynamic method comprises one of a weighted relative permeability method, a vertical equilibrium (VE) method, a Stone method, a Kirchoff's Law method, a steady-state simulation method, a transmissibility weighted method, and a Hewett and Archer method.

10. The method of claim 1, further comprising:
predicting at least one of a presence, location, and amount of hydrocarbons in the subsurface formation; and
managing hydrocarbons in the subsurface formation based on said prediction.

11. A method of multiphase flow upscaling of a fine scale geologic model, comprising:
from the fine scale geologic model, defining a local domain for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;
imposing a set of boundary conditions on an upstream face of the concatenated domain and a downstream face of the downstream coarse grid domain;
imposing a no-flow boundary condition on faces of the concatenated domain, the upstream coarse grid domain, and the downstream coarse grid domain parallel to a direction of fluid flow;
simulating fluid flow through the local domain for a plurality of time steps until the local domain is completely flooded;
at each time step, recording a fine scale solution of saturation and flow rate of individual fluid phases across the coarse grid interface;
constructing a pseudo-function by post-processing results of the simulation of fluid flow; and
upscaling the fine scale geologic model to a coarse scale geologic model using the pseudo-function.

12. The method of claim 11, wherein the set of boundary conditions comprises a flux rate boundary condition.

13. The method of claim 11, wherein the set of boundary conditions comprises a pressure boundary condition.

14. The method of claim 11, wherein the upstream coarse grid domain corresponds to a domain of a gridblock of a coarse scale geologic model where the pseudofunction is to be generated.

15. The method of claim 11, wherein the concatenated domain is a domain of a gridblock of a coarse scale geologic model.

16. The method of claim 11, wherein constructing the pseudo-function uses a dynamic method.

17. The method of claim 16, wherein the dynamic method is a pore volume weighted method.

18. The method of claim 16, wherein the dynamic method is a Kyte and Berry method.

19. The method of claim 11, further comprising:
predicting at least one of a presence, location, and amount of hydrocarbons in the subsurface formation; and
managing hydrocarbons in the subsurface formation based on said prediction.

20. A system for multiphase flow upscaling of a fine scale geologic model, the system comprising:
a processor;
a storage medium; and
a computer application accessible by the processor and stored on at least one of the storage medium and the processor, the computer application adapted to:
from the fine scale geologic model, define a local domain to generate a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;
impose a constant pressure boundary condition of $P=1$ and a saturation condition of $S_d=1$ on an upstream face of the concatenated domain;
impose a constant pressure boundary condition of $P=0$ and a saturation condition of $S_d=0$ on a downstream face of the downstream coarse grid domain;
impose a no-flow boundary condition on faces of the concatenated domain, the upstream coarse grid domain, and the downstream coarse grid domain parallel to a direction of fluid flow;
simulate fluid flow through the local domain for a plurality of time steps until the local domain is completely flooded;
at each time step, record a fine scale solution of saturation and flow rate of individual fluid phases across the coarse grid interface;
construct a pseudo-function by post-processing results of the simulation of fluid flow; and
upscale the fine scale geologic model to a coarse scale geologic model using the pseudo-function.

21. A computer program product having computer executable logic recorded on a tangible, machine readable medium, the computer program product comprising:
code for defining, from the fine scale geologic model, a local domain for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;

code for imposing a constant pressure boundary condition of P=1 and a saturation condition of Sct=1 on an upstream face of the concatenated domain;

code for imposing a constant pressure boundary condition of P=0 and a saturation condition of Sct=0 on a downstream face of the downstream coarse grid domain;

code for imposing a no-flow boundary condition on faces of the concatenated domain, the upstream coarse grid domain, and the downstream coarse grid domain parallel to a direction of fluid flow;

code for simulating fluid flow through the local domain for a plurality of time steps until the local domain is completely flooded;

code for recording, at each time step, a fine scale solution of saturation and flow rate of individual fluid phases across the coarse grid interface;

code for constructing a pseudo-function by post-processing results of the simulation of fluid flow; and code for upscaling the fine scale geologic model to a coarse scale geologic model using the pseudo-function.

22. A method of managing hydrocarbon resources, comprising:

from a fine scale geologic model, defining a local domain for generating a dynamic pseudo-function, the local domain including an upstream coarse grid domain adjacent a downstream coarse grid domain, and a concatenated domain adjacent the upstream coarse grid domain, the local domain being configured such that fluid flow to be modeled therethrough flows first through the concatenated domain, then through the upstream coarse grid domain, and lastly through the downstream coarse grid domain, wherein a coarse grid interface is defined between the upstream coarse grid domain and the downstream coarse grid domain;

imposing a constant pressure boundary condition of P=1 and a saturation condition of $S_d$=1 on an upstream face of the concatenated domain;

imposing a constant pressure boundary condition of P=0 and a saturation condition of $S_d$=0 on a downstream face of the downstream coarse grid domain;

imposing a no-flow boundary condition on faces of the concatenated domain, the upstream coarse grid domain, and the downstream coarse grid domain parallel to a direction of fluid flow;

simulating fluid flow through the local domain for a plurality of time steps until the local domain is completely flooded;

at each time step, recording a fine scale solution of saturation and flow rate of individual fluid phases across the coarse grid interface;

constructing a pseudo-function by post-processing results of the simulation of fluid flow;

upscaling the fine scale geologic model to a coarse scale geologic model using the pseudo-function; and managing hydrocarbon resources using the coarse scale geologic model.

23. The method of claim 22, wherein managing hydrocarbon resources comprises extracting hydrocarbons from a subsurface region.

* * * * *